(12) United States Patent
Ellis

(10) Patent No.: US 6,718,318 B1
(45) Date of Patent: Apr. 6, 2004

(54) SYSTEM AND METHOD FOR INTEGRATING A SERVO SYSTEM

(75) Inventor: George H. Ellis, Blacksburg, VA (US)

(73) Assignee: Kollmorgen Corporation, Radford, VA (US)

(*) Notice: Subject to any disclaimer, the term of this patent is extended or adjusted under 35 U.S.C. 154(b) by 0 days.

(21) Appl. No.: 09/579,190

(22) Filed: May 26, 2000

(51) Int. Cl.[7] .................................................. G06N 5/02
(52) U.S. Cl. ........................... 706/60; 706/45; 706/46
(58) Field of Search ........................... 706/60, 45, 46, 706/50; 700/28; 370/254

(56) References Cited

U.S. PATENT DOCUMENTS 6,041,044 A * 3/2000 Seiffert et al. .............. 370/254
2003/0144746 * 7/2003 Hsiung et al. ............... 700/28
2003/0154144 * 8/2003 Pokorny et al. .............. 705/28

OTHER PUBLICATIONS

Biro, Robert F. et al, Modular Visual Servo Tracking for Industrial Robots, 1997, Available: http://helix.gatech.edu/papers/1997/Vservo.PDF.*

* cited by examiner

*Primary Examiner*—Wilbert L. Starks, Jr.
(74) *Attorney, Agent, or Firm*—Morgan & Finnegan LLP

(57) ABSTRACT

The present invention relates to an expert system for recommending a modification to a machine having a servo system. The expert system may be implemented as an unlimited access web site.

24 Claims, 10 Drawing Sheets

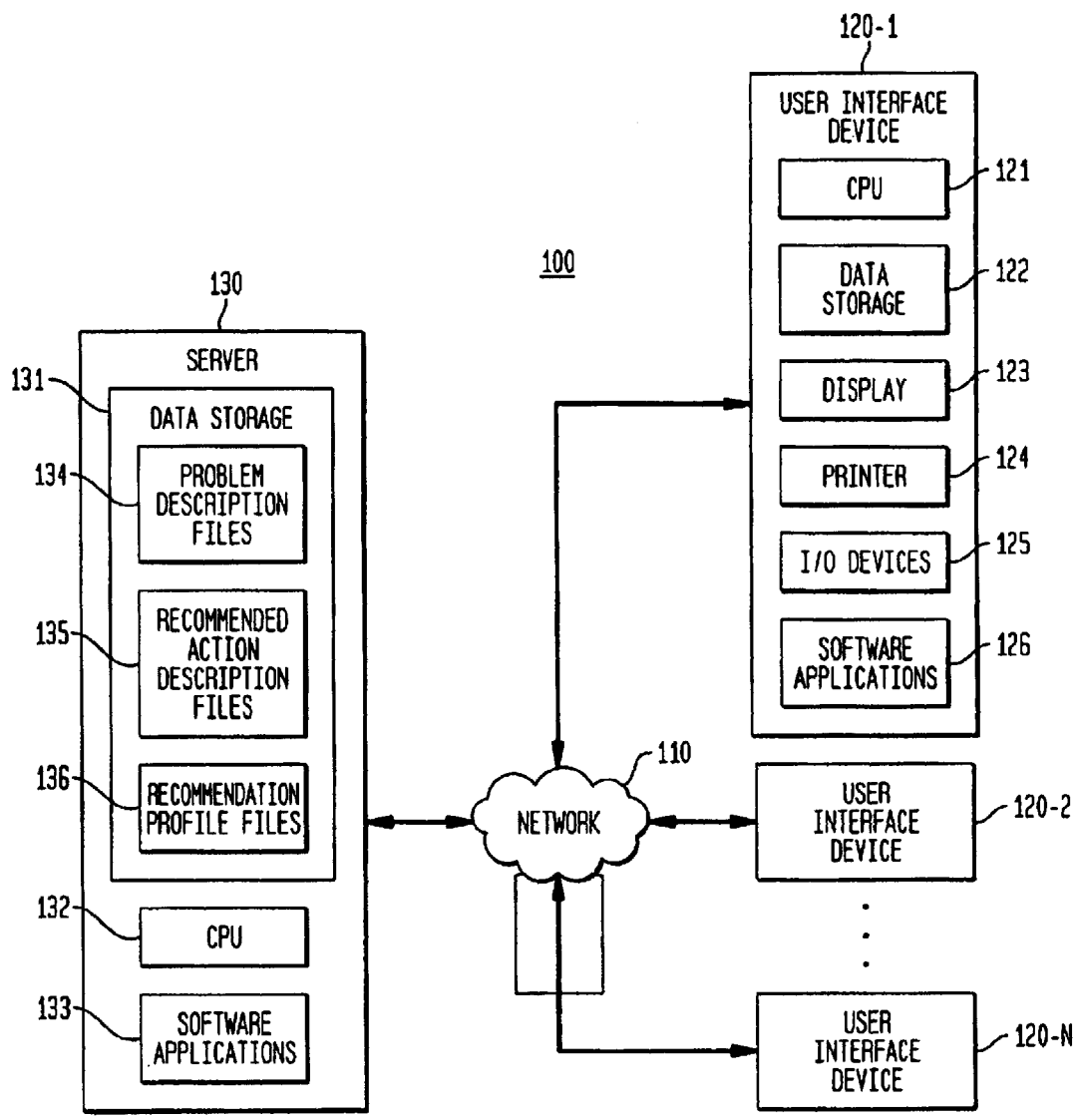

FIG. 2C

Web Browser

File  Edit  View —230

Back | Forward | Stop | Refresh —240

Address  245

Final Stage of the invesigation.
This is the final stage of the investigation. There are a few questions left to answer on the flexibility of your application. Also, you should review the information compiled from your investigation so far.

1. Specify the transmission being used in the axis.
- A direct-drive motor such as a Kollmorgen Direct-Drive Linear (DDL) or Direct-Drive Rotary (DDR).
- A shafted motor with geared transmission components such as a gearbox, belt/pulley set and/or lead screw.
- A shafted motor without a geared transmission; the only transmission components are shaft and couplings.

275-1 —

2. Specify the flexibility you have in this application.

Cost Flexibility
Please rate your level of flexibility in considering changes that may raise the cost of your system.
- I can consider changes that have only MINIMAL impact on cost.
- I can consider changes that have only MODERATE impact on cost.   } 276-1
- I can consider all changes, independent of cost impact.

Time Flexibility —275-2
Please rate your level or flexibility in considering changes that may require time to implement
- I can consider changes that require only a MINIMAL amount of time to implement.
- I can consider changes that require only a MODERATE amount of time to implement.   } 276-2
- I can consider all changes, independent of implementation time.

3. Review the results of your investigation
Please review the following table which has recorded your entries so far.

270 {

| | Primary | Serious | Moderate | Small |
|---|---|---|---|---|
| Excessive following error | O | O | O | ● |
| High-frequency overshoot | O | O | O | ● |
| High-frequency resonance | O | O | O | ● |
| Limit cycles | O | O | O | ● |
| Low bandwidth | O | O | ● | O |
| Low-frequency overshoot | O | O | O | ● |
| Low-frequency resonance | O | O | O | ● |
| Poor dynamic stiffness | O | O | O | ● |
| Poor static stiffness | O | O | O | ● |
| Random noise | O | O | O | ● |
| Slow settling | O | O | O | ● |
| Undersized system | O | O | ● | O |
| Variation in load inertia | O | O | O | ● |
| Vibration | O | O | O | ● |
| Zero-speed position error | O | O | O | ● |

3. View recommendation
Click on the button below to view a list of suggested recommended actions.

210-3

295 — [ view recommendations ]

SYSTEM AND METHOD FOR INTEGRATING A SERVO SYSTEM

BACKGROUND OF THE INVENTION

1. Field of the Invention

The present invention relates generally to expert systems and, more particularly, to systems and methods for solving problems related to performance or operation of a servo system during its integration into a machine.

2. Description of Related Art

Servo systems are complex mechanisms to be inserted or incorporated into machines. Due to the complexity of many servo systems, the potential causes of servo performance or operational issues may span many technical disciplines. Individuals who select a particular servo system for use in a specific machine frequently need help improving servo performance and diagnosing servo operational problems. Since most servo system users cannot spend the time necessary to develop the skills and expertise for diagnosing and correcting servo problems, expert assistance is usually required. Indeed, the solution to a particular servo performance problem is often counter-intuitive.

Many servo problems occur during the integration phase, i.e., after a machine has been designed, but before it has been placed into service. The integration phase is to be distinguished from both the design and the troubleshooting phases of a servo system's life span. Servos are usually designed by mechanical engineers who design to avoid traditional mechanical problems such as improper clearances, catastrophic failure due to stress, fatigue and normal wear. However, other servo problems such as long response times, instability, mechanical resonance, inaccurate positioning, excessive torque perturbations, and excessive generation of noise can seriously degrade performance or operation of a machine. These types of problems often are not detected until after the servo design has been completed. By such a time, the machine has often been built and awaits being put into service.

Engineers who seek advice during the integration phase of servo design are faced with a unique set of limitations; the problems must be corrected with minimal design changes and, usually, in a short period of time because the machine has been built and is usually due to be placed into service soon. Engineers are not dealing with traditional design problems such as selecting materials, topology or mechanisms. These decisions must be made before the machine prototype can be built. Also, engineers are not dealing with traditional troubleshooting that involves isolating problems on presumably well-designed machines that have been in service for a significant amount of time. Problems solved by troubleshooting do not even occur until after a machine has been placed in service, e.g., problems caused by wear or component failure.

It has long been known that servo system users need an alternative to human-based assistance. Telephone conversations with an expert are often inadequate, and obtaining on-site help is usually impractical because it is expensive and time consuming. Some servo users have developed procedures to solve certain classes of problems without relying on an expert. For example, some servo system manufacturers and users have developed flowcharts to help diagnose faults. This flowchart method of problem solving may be appropriate when only binary (i.e., yes/no) decision-making processes are required to diagnose the problem, e.g., eliminating a drive error or finding an open electrical connection. However, binary decision-making processes alone cannot be used to diagnose and solve problems related to servo performance since those problems are often combinations of multiple root causes that occur in varying degrees. Problems encountered during servo system integration usually have subjective (i.e., non-binary) representations. Thus, a more robust form of diagnostic and problem solving tool is required.

An expert system can often address problems based on several causes which occur in varying degrees. The field of expert systems was developed to provide non-human expert assistance. For example, physicians and psychiatrists use expert systems to some extent to aid in patient diagnosis. U.S. Pat. No. 5,660,183 to Chiang et al. discusses such an expert system. Engineers use expert systems during the design and troubleshooting phases of a product or process life-cycle. U.S. Pat. No. 5,557,775 to Shedletsky discloses such a use. However, most expert systems are used either to help design an object or process, or to troubleshoot problems that have developed after the object or process has been designed and put into operation.

It is therefore an object of the present invention to provide an expert system which can serve as an alternative to human-based assistance by providing non-human expert assistance in diagnosing and correcting common servo performance problems which are detected when a machine or prototype is first made operational, or shortly thereafter.

It is another object of the present invention to provide an expert system which can address several independent and subjective problems simultaneously.

It is a further object of the present invention to provide an expert system capable of quickly providing a range of several potential modifications to address a particular observed machine condition.

SUMMARY OF THE INVENTION

The present invention overcomes the shortcomings of conventional servo system integration techniques and conventional expert systems. Specifically, the invention features systems and methods which allow a user to input information describing a particular servo system, and then receive an ordered set of possible actions the user can implement to solve the observed problems.

Certain embodiments of the present invention include a method and system that presents a description of one or more general servo conditions and a plurality of severity designations for the one or more general servo conditions, receives data descriptive of a machine's specific state, the machine having a servo, and generates a recommendation containing an instruction as to modification of the machine or servo.

Another embodiment of the present invention is a system comprising a memory having embodied therein: data descriptive of one or more general servo conditions and a plurality of severity designations for the one or more servo conditions, and data descriptive of a plurality of recommendations each describing one or more modifications to a machine having a servo system; a central processing unit in communication with the memory, the processor configured to receive data descriptive of a machine's specific state including one or more general servo conditions and a corresponding severity designation, the machine having a servo, and to select one or more of the plurality of recommendations based in part on the data descriptive of the machine's specific state.

A further embodiment of the invention comprises an expert system for recommending a modification to a machine having a servo system, the expert system comprising a server configured to receive data descriptive of one or more servo system problems and to present data descriptive of an ordered set of solutions to the one or more servo system problems.

BRIEF DESCRIPTION OF THE DRAWINGS

The novel features and other aspects of the present invention are explained in the following description taken in connection with the accompanying drawings, wherein:

FIG. 1 illustrates a block diagram of an expert system according to one embodiment of the present invention.

FIG. 2c shows a graphical display of a machine condition profile assembled using the system shown in FIG. 1.

DETAILED DESCRIPTION

Figure 2A:
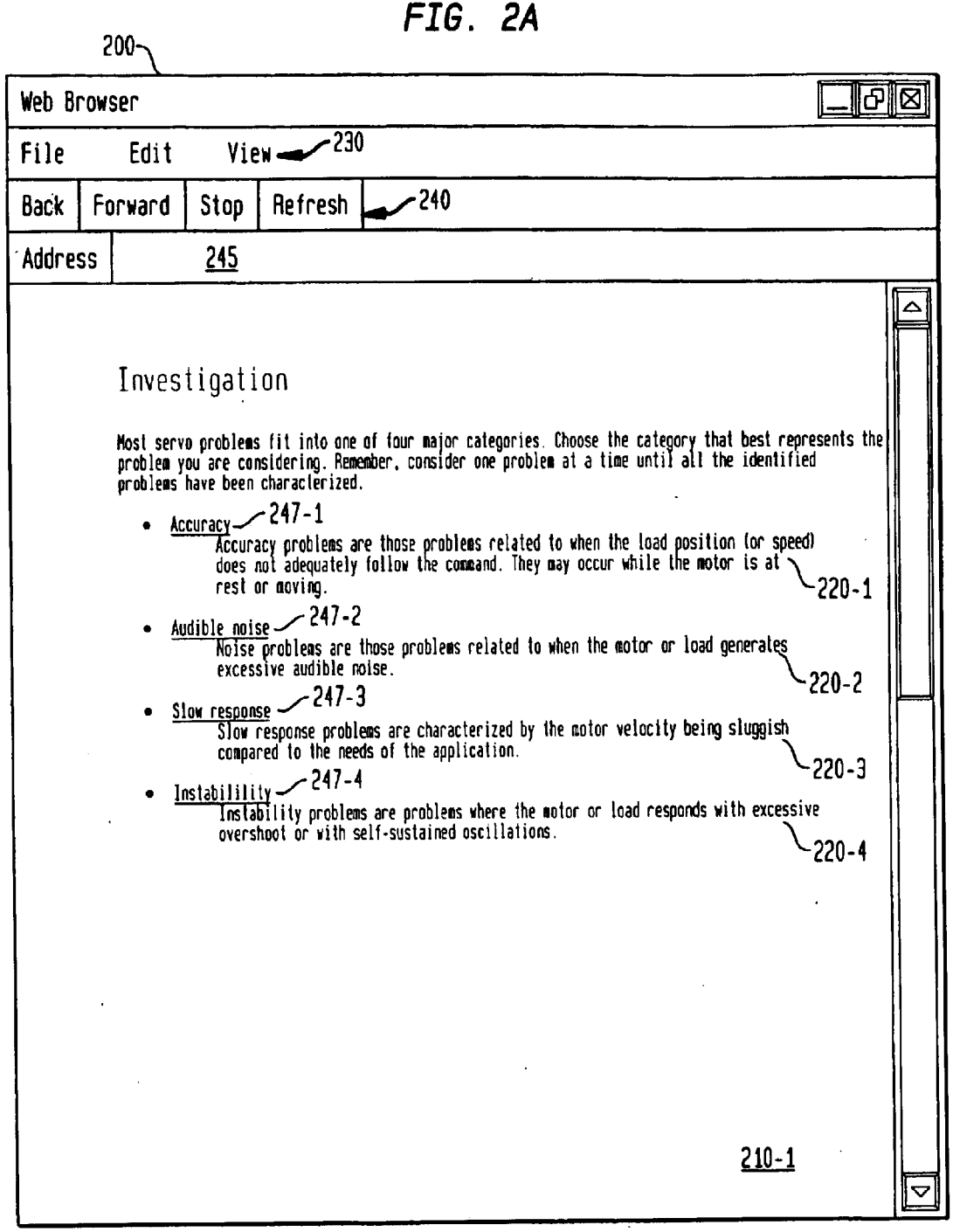
FIG. 2a shows examples of several types of problem descriptions displayed by the system shown in FIG. 1.

The structure, functional implementation and operation of embodiments of the present invention will now be described in greater detail with reference to the figures.

1. Structure And Functional Implementation

One embodiment of the expert system of the present invention is a web site accessible from any point on the Internet. Such a web site may reside on one or more servers in a known way to allow a user to input information about a machine having a servo system and to obtain recommendations for modifying the machine or servo system in order to improve operation or performance. Content pages may be generated by software running on the server. These content pages may then be transferred across the Internet from the server to a web browser running on a user interface device (e.g., personal computer). The web site is generated by hypertext mark up language (HTML) software, and JavaScript logic implements the algorithms necessary to present a ranked list of recommended actions to the user. The combination of an HTML-based human interface and a JavaScript logic program provides a web site to guide a user through a three-step process of abstraction, matching and refinement as described in more detail below.

FIG. 1 shows a schematic of one expert system 100 according to the present invention. The expert system 100 generally includes a network 110 in communication with one or more user interface devices 120 and a server 130. In one embodiment, a user interface device 120 may be a personal computer comprising one or more central processing units (CPU) 121, one or more data storage devices 122 (i.e., a computer readable memory medium such as a hard disk, CD-ROM, DVD-ROM, or floppy diskette), a monitor or other type of display device 123, a printer 124, input/output devices 125 such as a keyboard, a pointing/selecting device (e.g., mouse or track ball) or touch screen interface and other hardware components necessary to allow a user to implement the commands of the software and hardware functions described herein. It is to be understood, however, that the user interface devices 130 may also be terminals other than personal computers. Terminals can access the network 110 to allow the user to interact with the information contained in the server 130.

The software applications (e.g. 126) needed to run the expert system 100 may reside on the user interface device 120, may be implemented through a server/client relationship, or may be accessible through any other suitable arrangement. In one embodiment of the invention, the user interacts with a computer 120 attached to a network 110 which can access the needed software applications residing on both the computer 120 and a server 130.

Server 130 has at least one data storage device 131 (i.e., a computer readable memory medium such as a hard disk, CD-ROM, DVD-ROM, or floppy diskette) and one or more CPUs 132. The computer software 133 necessary to run the expert system 100 on the server 130 may include an operating system and a database management application. The network 110 that enables communication between the server 130 and a user interface device 120 may be the Internet (e.g., world wide web), a wide area network (WAN), a local area network (LAN), an intranet or other network capable of communicating the appropriate data between hardware and/or software devices. More specifically, the network 110 provides a medium through which users may transmit their observed servo system problems and receive a list of recommended actions to solve those problems as described herein. In one embodiment, a host site residing on the server 130 accesses the data storage device 131 which stores a centralized server library of program files including graphics, text and executable files (file types such as .html, .exe, .txt, etc.). Although the present embodiment identifies one server 130, a plurality of servers (not shown) may also be coupled with the network 110 and therefore in communication with the user interface devices 120.

The Internet is a global communications network interconnecting many computers and networks via communications links. Much of the Internet works on a client/server model. In a typical client/server model, a local or "client" computer runs a web browser software application (e.g., Netscape Communicator or Microsoft Internet Explorer). Additional software runs on the server. To use the Internet, a client computer requests information from a server computer in the form of an HTTP (Hypertext Transfer Protocol) request. For example, the client computer may request a particular web page from the server computer. The server processes the HTTP request and responds by sending the requested web page to the client in the form of an HTTP response. When the web browser contacts the server, it asks the server for content pages built with HTML. The web browser interprets the information from the server and displays it on the local computer. Networks such as the Internet use addressing schemes such as Internet Protocol to uniquely identify every computer connected to the Internet.

Figure 2B:
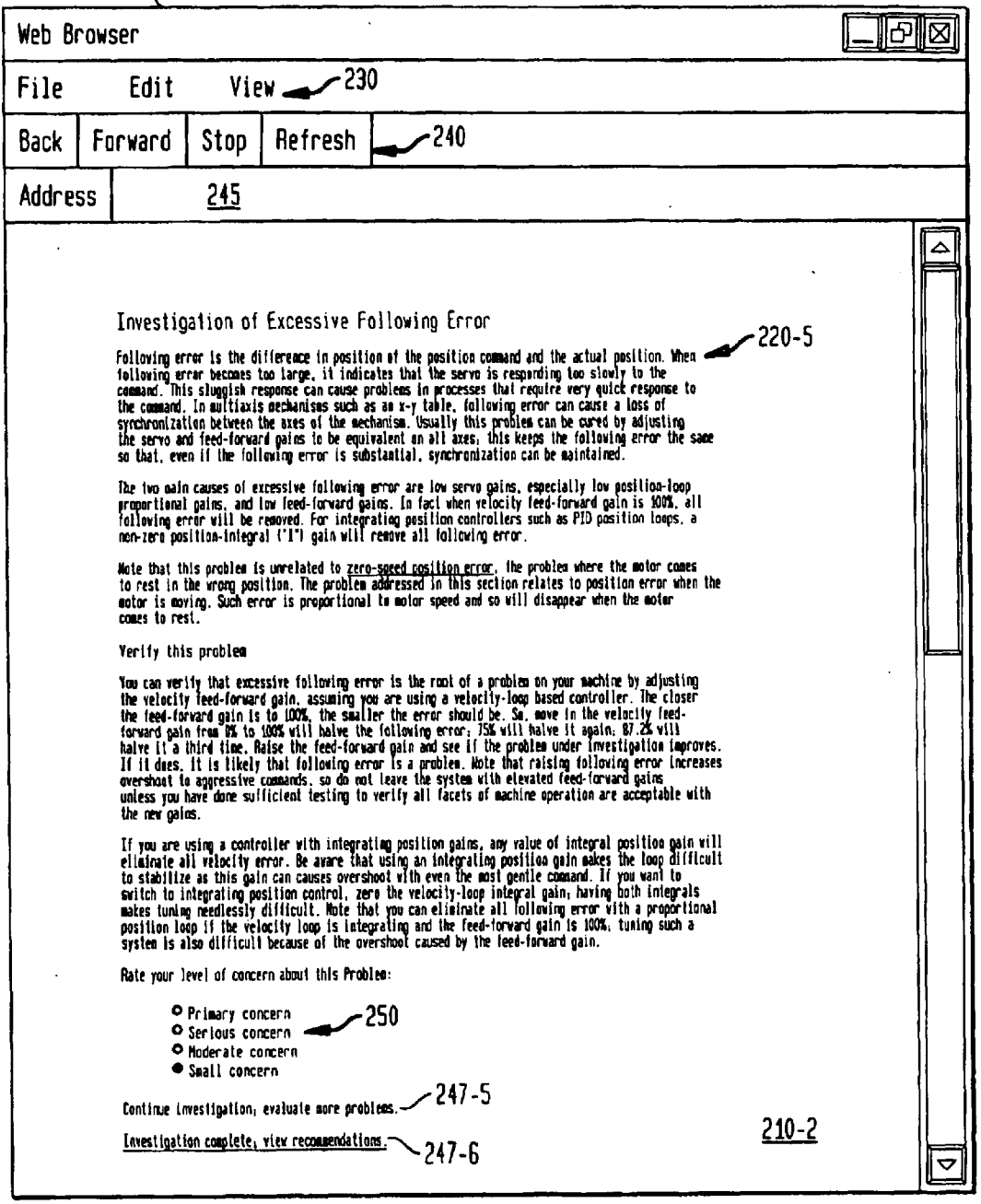
FIG. 2b illustrates a sample user interface for entering into the system shown in FIG. 1 information used to create a machine condition profile.

As shown in FIGS. 2a and 2b, one embodiment of the expert system 100 of the present invention uses a web browser 200 software application to present a graphical user interface (GUI) in the form of one or more content pages 210. FIGS. 2a–2c illustrate examples of such a GUI. Each content page 210 contains descriptions 220 of generic servo system problems. FIG. 2a shows a web browser 200 as it may be presented on a display device 123 (e.g., computer monitor). The web browser 200 has pull-down menus 230 which allow the user to, inter alia, access and interact with software files. Using the pull-down menus 230, the user can request a copy of one or more content pages 210 in electronic form or hardcopy. The web browser 200 also has control buttons 240 to help the user browse through different content pages 210. The web browser 200 further has an address line 245 which allows the user to request directly a particular content page 210 by entering its address (e.g., HTTP address).

FIG. 2*a* illustrates a content page 210 with an example of several problem descriptions 220 according to one embodiment of the invention. One or more experts generate the problem descriptions 220 based on experience integrating servo systems into machines such as industrial manufacturing equipment. The problem descriptions 220 provide the user with information necessary to decide whether the specific machine under observation exhibits any of the general performance or operational problems described by the expert system 100.

Hypertext links 247 allow a user to jump from one content page 210 to another. A content page 210 may contain one or more hypertext links 247 to further content pages (e.g., 210-2) containing further problem descriptions (e.g., 220-5). The user may select a particular content page 210 by selecting a link 247, using the web browser control buttons 240 or entering an address in the address line 245. HTML allows a user to view content pages 210 and jump between them using hypertext links 247.

FIG. 2*b* shows a content page 210 containing both a problem description 220-5 and a set of severity ratings 250. After reading the content page 210 the user may be prompted to select and enter a particular severity rating 250 corresponding to the particular problem description 210-5 being presented. A machine condition profile 270 is built as the user selects and enters severity ratings 250 corresponding to the particular condition of the machine under observation. FIG. 2*c* shows a graphical representation of a machine condition profile 270.

In one embodiment, data reflecting the problem descriptions 220 may be stored in problem description files 134 kept in the server's data storage device 131. Similarly, data reflecting recommendation profiles 280 may reside in recommendation profile files 136, and recommended actions 290 may reside in recommended action description files 135. The problem description files 134, recommendation profile files 136 and recommended action description files 135 are created by one or more human experts and loaded into the server's data storage device 131 in a known way. In an alternative embodiment, the problem description files 134, recommendation profile files 136 and recommended action description files 135 can be loaded directly into the user interface's data storage device 122 in a known way, thereby eliminating the need to access the server 130 over the network 110.

Figure 3:
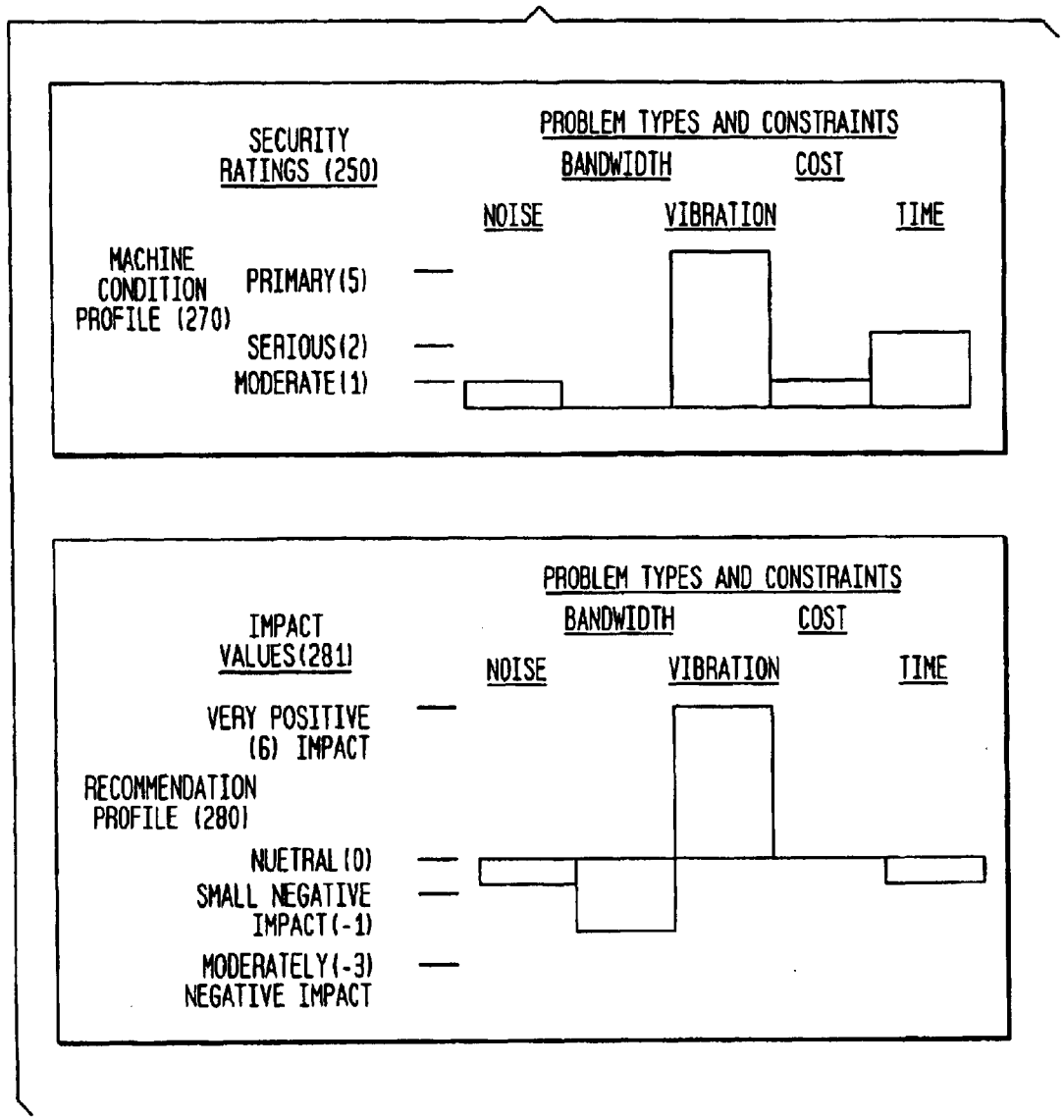
FIG. 3 illustrates an example of the contents of a machine condition profile and a recommendation profile.

FIG. 3 shows a graphical representation of example contents of a machine condition profile 270 describing a particular machine under observation. FIG. 3 also shows a graphical representation of example contents of a recommendation profile 280. In one embodiment of the present invention, each recommendation profile 280 contains a set of predetermined impact values 281 established by one or more human experts which reflect the positive, neutral or negative impact (and the severity of that impact) of a particular recommended action 290 on the performance and operation of a machine having a servo system. The impact value 281 reflects how much a modification to the machine as described in the particular recommended action 290 will effect each type of problem and constraint. For example, the recommendation profile shown in FIG. 3 indicates that making the modification suggested by the recommended action 290 will have a small negative impact on a noise problem, will be somewhat time consuming to implement, will have a moderately negative impact on a bandwidth problem, but will have a very positive effect on curing a vibration problem. Comparison of the recommendation profile 280 and machine condition profile 270 in FIG. 3 indicates that the particular recommended action 290 corresponding to the recommendation profile 280 shown would produce a favorable solution to the problems indicated in the machine condition profile 270 shown. In one embodiment, all recommended actions 290 the expert system 100 might present to a user have a corresponding recommendation profile 280.

Having described the structure and functional implementation of embodiments of the present invention, the operation of the system 100 will now be described with reference to FIGS. 4*a*–7, and continuing reference to FIGS. 1–3.

2. Operation

In general, the expert system 100 employ a three-step method of abstraction, matching and refinement to solve a particular problem. The expert system 100 prompts a user to convert the observed behavior of a particular machine having a servo system (i.e., specific problems) into general problems and to rank the severity of each general problem. In response, the expert system 100 creates a ranked list of recommended actions 290 the user can employ to improve the machine's performance or operation (i.e., cure the specific problems observed).

A. Abstraction

Abstraction is the process of converting specific problems the user has observed while monitoring the behavior of a machine, into general problems. For example, if a user detects a high-pitched, pure tone generated by the servo when servo gains are high, the general problem is probably high-frequency resonance. Converting "high-pitched tone" to "resonance" requires abstraction. Abstraction also entails weighting or ranking each problem in terms of its severity. A machine condition profile 270 contains a list of problems present in a particular servo system and the severity with which each problem has been observed (see FIG. 3). The machine condition profile 270 is constructed by abstracting specific problems to multiple general problems with the assistance of the expert system 100.

Figure 4A:
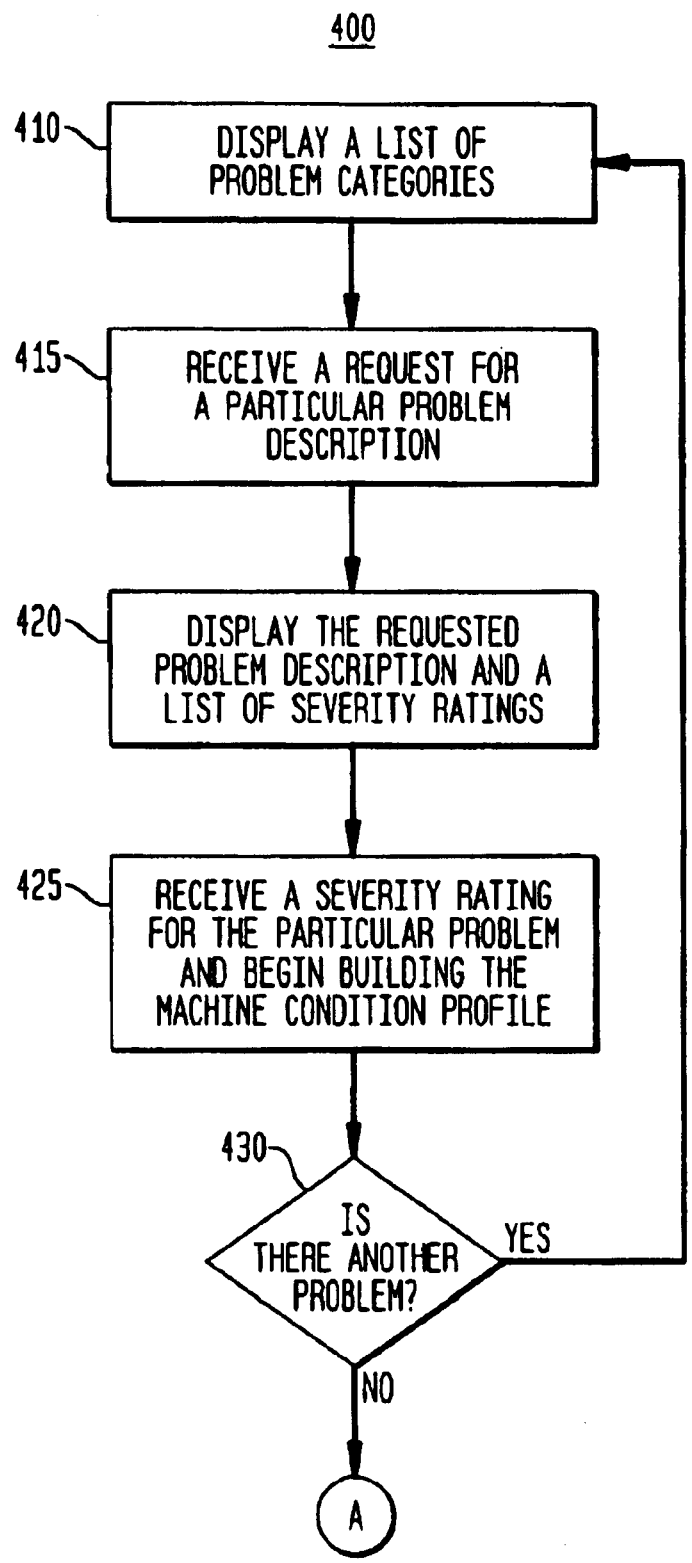
FIGS. 4a and 4b show a flowchart illustrating the major steps performed by the system shown in FIG. 1 in defining a machine condition profile.
Figure 4B:
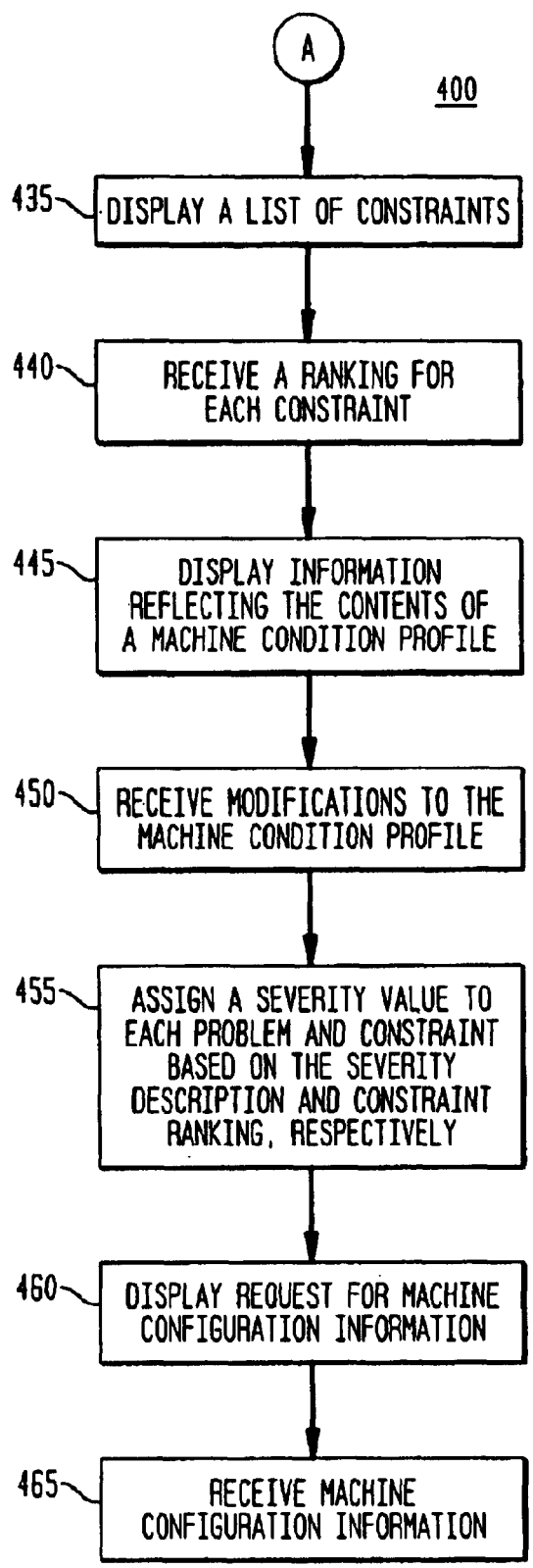

FIGS. 4*a* and 4*b* illustrate how an embodiment of the expert system 100 of the present invention implements an abstraction process 400. During abstraction, the user reviews the performance of the machine having a servo. The expert system 100 displays (step 410) a list of problem categories (e.g., FIG. 2) for the user to read and compare to the condition of a particular machine under observation. The user requests (step 415) more information by selecting a particular category of problems. The expert system 100 then displays (step 420) problem descriptions 220 as requested along with a list of severity ratings 250 for each problem. As the user browses through content pages 210 containing problem descriptions 220 and severity ratings 250, the user is prompted to rate each problem as either, for example, PRIMARY, SERIOUS, MODERATE, or SMALL. When the user selects a particular severity rating 250 for a particular problem description 220, the expert system 100 begins to build a machine condition profile 270 (e.g., FIG. 3) (step 425). The expert system 100 continues to prompt the user to enter more severity ratings 250 until all observed problems have been entered into the expert system 100 (step 430). The combination of severity rating 250 and problem description 220 makes up much of the machine condition profile 270. However, other items may also be part of the machine condition profile 270.

The user's flexibility in adding cost to the machine and the amount of time required to implement a particular recommended action 290 are examples of constraints 275 on a particular recommended action 290. The expert system 100 displays (step 435) a list of constraints 275 (e.g., FIG. 2c) along with a list of priority rankings 276 for each constraint 275. The expert system 100 prompts the user to prioritize each constraint 275. In the matching process described below, the priority rankings 276 are treated the same as severity ratings 250, and constraints 275 are treated the same as problem descriptions 220.

Once the user has entered all the constraint and problem information, the expert system 100 provides a summary of the entered information (step 445) (see FIG. 2c). In one embodiment, the user is then prompted to change or correct the information reflecting the contents of the machine condition profile 270. The expert system 100 modifies the machine condition profile 270 according to the user's changes (step 450). The expert system 100 also assigns each severity rating 250 and priority ranking 276 a numerical value (step 450).

In one embodiment, the user is also prompted to enter information about the machine's configuration (steps 460, 465). For example, the user may be asked to specify the type of transmission being used in the machine (see FIG. 2c). Information reflecting the machine configuration may be included with the other contents of the machine condition profile 270.

It is to be understood, however, that the scope of the present invention is not limited to execution of the aforementioned steps in the order discussed. Rather, the steps shown in FIGS. 4a and 4b can be implemented in a variety of sequences.

B. Matching

Matching is the process of finding the set of one or more recommended actions 290 that best fit a particular machine condition profile 270. In accordance with one embodiment, one or more human experts construct a number of recommended actions 290 likely to help users experiencing servo problems. Each recommended action 290 varies in its effectiveness in dealing with each of the problems. Some recommended actions 290 may improve a particular problem (to a varying degree), some may have no significant impact on the problem and others may worsen the problem (again, to a varying degree). A recommendation profile 280 for each recommended action 290 has been developed where the degree to which a particular recommended action 290 helps or worsens a problem is determined by one or more human experts. In one embodiment, the degree to which a recommended action 290 is found to be appropriate for a particular machine condition profile 270 is based on the dot product (term by term multiplication) of the machine condition profile 270 and the recommendation profile 280 of the recommended action 290. Recommended actions 290 are considered likely to help the user if the dot product of the recommendation profile 280 and the machine condition profile 270 is positive. The higher the dot product, the more likely the recommended action 290 will be useful. Each recommended action 290 that produces a positive dot product is presented to the user with a score which is equal to the value of the dot product. Higher scoring alternatives are listed first.

In FIG. 3, two simplified profiles, one of a machine condition 270 and one of a recommendation 280 are shown graphically. In the example shown, there are five problem categories: noise, bandwidth, vibration, cost and time. It is to be understood, however, that the expert system 100 of the present invention may address addition types of problems such as at least the following: excessive following error, high-frequency overshoot, high-frequency resonance, limit cycles, low bandwidth, low-frequency overshoot, low-frequency resonance, poor dynamic stiffness, poor status stiffness, random noise, slow settling, undersized system, variation in load inertia, vibration and zero-speed position error (see FIG. 2c). The observed machine has a primary (worst) problem with vibration, a serious problem with time to implement, and moderate problems with noise and cost. The recommendation profile 280, shown immediately below, is rated in the same categories. The recommended action 290 for the recommendation profile 280 illustrated is a good fit to the machine condition since the solution has a "6" rating (most effective) for the primary problem (vibration). It also has slightly worsening effects on noise problems and time to implement, and neither helps nor hurts the remaining moderate problem (cost). Although the recommended action 290 for the recommendation profile 280 shown in FIG. 3 has a large negative effect on bandwidth, this is not an issue here since bandwidth is not identified as a problem in the machine condition profile 270. The large positive effect, which is on the primary problem, outweighs the smaller negative effects on the less important problems.

Figure 5:
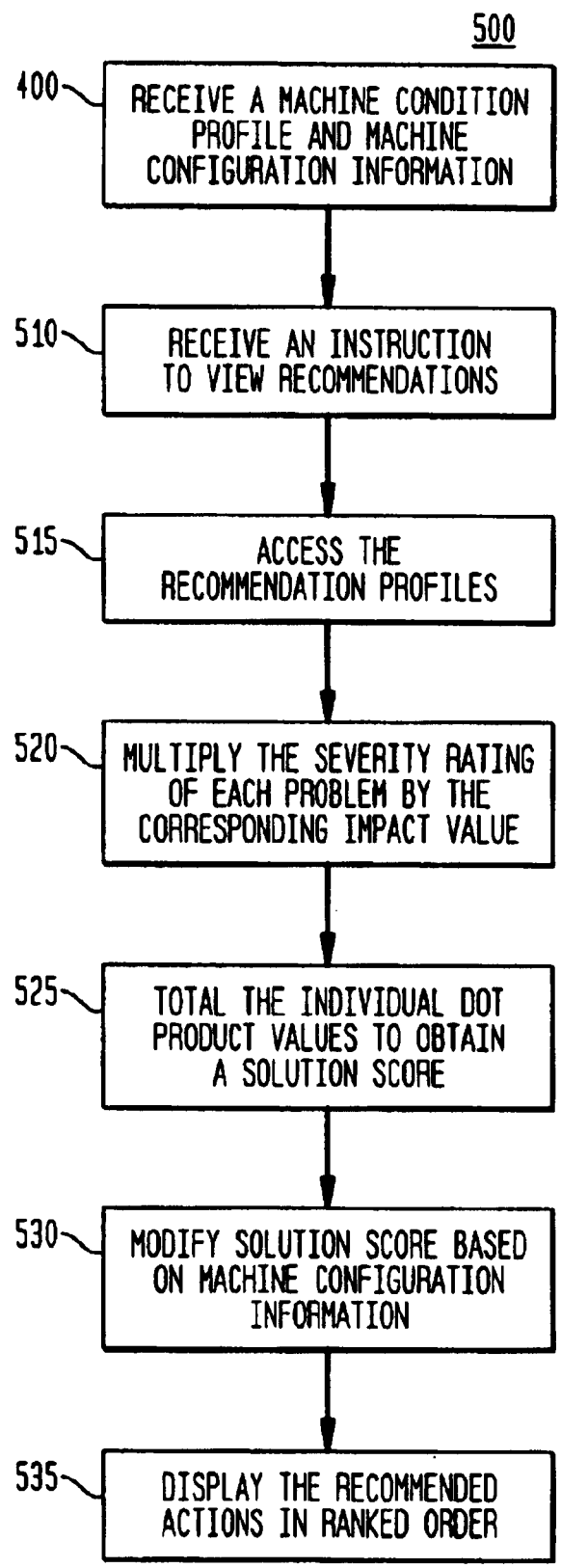
FIG. 5 is a flowchart illustrating the major steps performed by the system shown in FIG. 1 in generating a list of recommendations.
Figure 6:
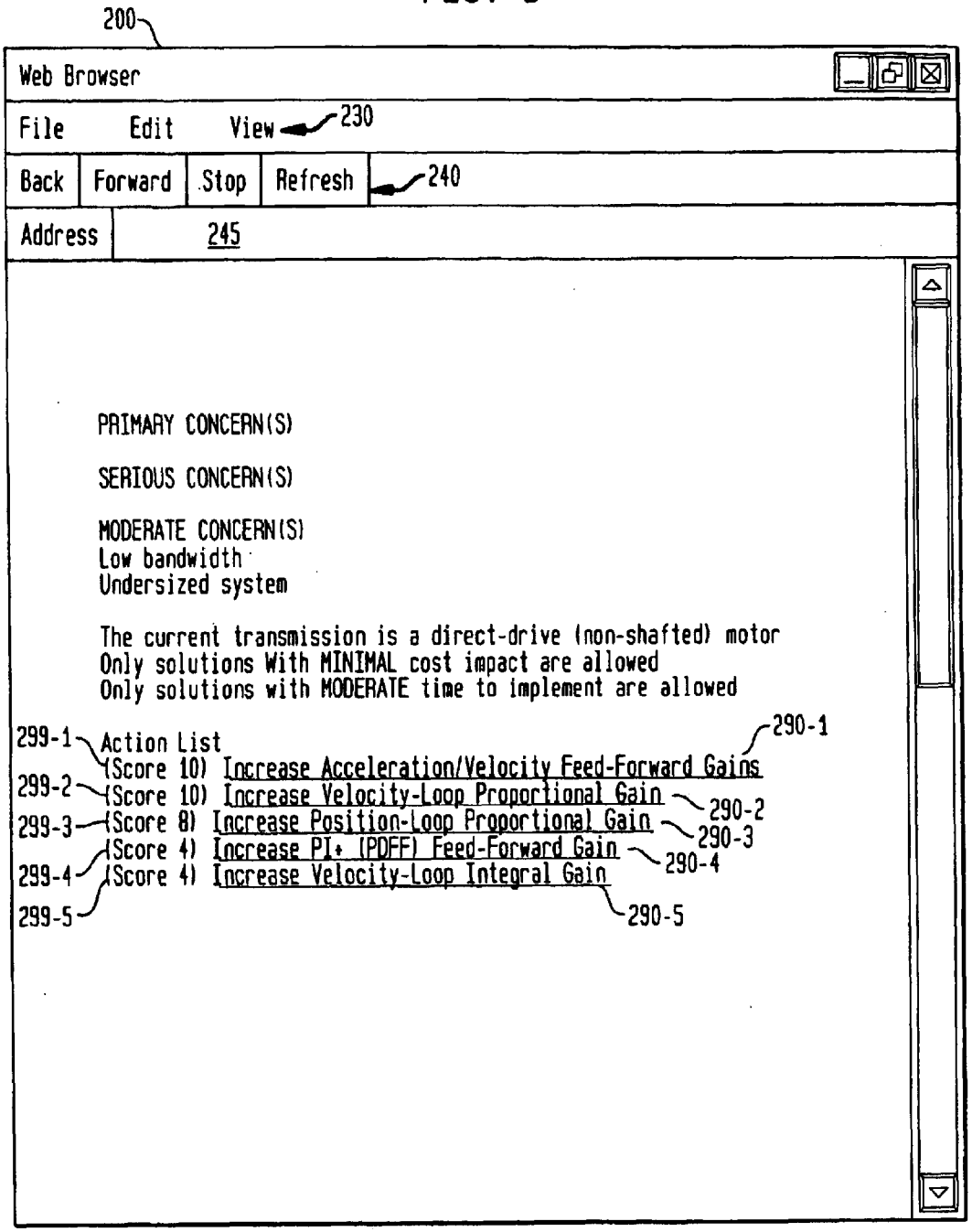
FIG. 6 illustrates an example of a ranked list of recommended actions generated by the system shown in FIG. 1.

FIG. 5 illustrates how an embodiment of the expert system 100 of the present invention implements a matching process 500. Once a machine condition profile 270 has been constructed (step 400), the user instructs the expert system 100 to create and present one or more recommended actions 290 (step 510). In one embodiment, the user accomplishes this step by selecting a "view recommendations" 295 button displayed on the web browser 200. The expert system 100 accesses the recommendation profiles 280 (step 515) and multiplies the severity rating 250 of each problem by the corresponding impact value 281 (step 520). Each of these individual "dot product" values are then totaled to produce a solution score 299 (step 525). In this way, each recommended action 290 stored in the server 130 will be assigned a solution score 299 based on the contents of the machine condition profile 270.

It can be necessary to modify the outcome of the dot product because the mathematical comparison does not have the necessary flexibility for some situations. For example, if the user were using a direct-drive motor (i.e., one without a transmission) then the recommended actions 290 "remove transmission" and "stiffen transmission" should not be allowed, no matter how well the profiles match. In one embodiment, the expert system 100 removes or re-prioritizes inappropriate recommended actions 290 before presenting them to the user by modifying the solution score 299 based in part on the machine configuration information or the constraints 275 (step 530). For example, a solution score 299 for a particular recommended action 290 may be set to zero if that recommended action 290 is inappropriate (e.g., "remove transmission" and "stiffen transmission" for a machine with no transmission). Alternatively, a solution score 299 may be increased or decreased based on the priority ranking 276 for a particular constraint 275. After modification, the recommended action 290 that produces the highest solution score 299 is presented as the first best fit for the entered machine condition profile 270 (step 535). The recommended action 290 that produces the next highest solution score 299 is presented as the second best fit. In one embodiment, the expert system 100 displays all recommended actions 290 which produce a positive solution score 299 (see FIG. 6). Each recommended action 290 displayed prompts the user to access a unique content page 210 giving the user the advantages and disadvantages of the modification, as well as a short "how to" so the user can get started. It is to be understood, however, that the scope of the present invention is not limited to execution of the aforementioned steps in the order discussed. Rather, the steps shown in FIG. 5 can be implemented in a variety of sequences.

C. Refinement

Figure 7:
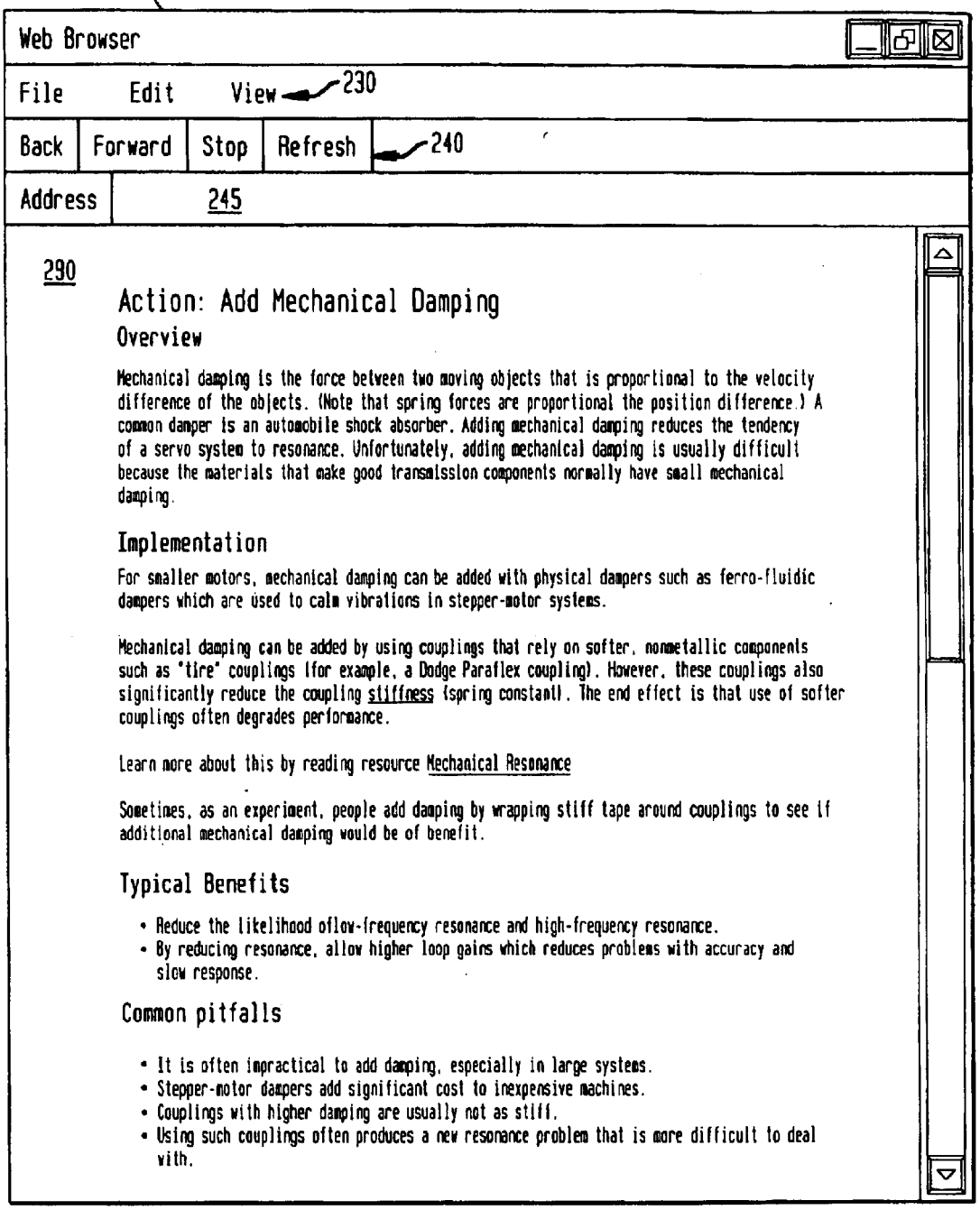
FIG. 7 illustrates an example of a recommended action description displayed by the system shown in FIG. 1.

The expert system 100 implements the process of refinement by providing access to explanations of each recommended action 290. When the user selects a potential recommended action 290, a new content page 210 is displayed explaining the recommended action 290, including how it works, how to implement it, and which problems will be corrected and which worsened. FIG. 7 shows such a recommended action 290. By reviewing several potential recommended actions 290, the user can determine which modifications to the machine are most appropriate.

Although specific embodiments of the present invention have been shown and described, it is to be understood that there are other embodiments which are equivalent to the described embodiments. Accordingly, it is to be understood that the invention is not to be limited by the specific illustrated embodiments, but only by the scope of the appended claims.

What is claimed is:

1. A system comprising:
   means for presenting a description of one or more general servo conditions and a plurality of severity designations for said one or more general servo conditions;
   means for receiving data descriptive of a machine's specific state, said machine having a servo; and
   means for generating a recommendation containing an instruction as to modification of said machine or said servo.

2. The system of claim 1, wherein said means for generating comprises:
   means for accessing a plurality of recommendation profiles containing data descriptive of a plurality of problem categories and an impact value for each of said problem categories; and
   means for selecting the recommendation based in part on said data descriptive of said machine's specific state and said plurality of recommendation profiles.

3. The system of claim 2, wherein said means for selecting comprises means for computing a dot product of said data descriptive of said machine's specific state and said plurality of recommendation profiles.

4. The system of claim 2, wherein said means for generating is further based in part on a constraint.

5. The system of claim 1, wherein said means for presenting comprises a web browser.

6. A method comprising:
   presenting a description of one or more general servo conditions and a plurality of severity designations for said one or more general servo conditions;
   receiving data descriptive of a machine's specific state, said machine having a servo; and
   generating a recommendation containing an instruction as to modification of said machine or said servo.

7. The method of claim 6, wherein said generating comprises:
   accessing a plurality of recommendation profiles containing data descriptive of a plurality of predefined problem categories and an impact value for each of said problem categories; and
   selecting the recommendation based in part on said data descriptive of said machine's specific state and said plurality of recommendation profiles.

8. The method of claim 7, wherein said selecting comprises computing a dot product of said data descriptive of said machine's specific state and said plurality of recommendation profiles.

9. The system of claim 6, wherein said generating is further based in part on a constraint.

10. The system of claim 6, wherein said presenting comprises displaying said description on a web browser.

11. A system comprising:
    a memory having embodied therein:
      data descriptive of one or more general servo conditions and a plurality of severity designations for said one or more servo conditions; and
      data descriptive of a plurality of recommendations each describing one or more modifications to a machine having a servo system; and
    a central processing unit in communication with said memory, said processor configured:
      to receive data descriptive of a machine's specific state including one or more general servo conditions and a corresponding severity designation, said machine having a servo; and
      to select one or more of said plurality of recommendations based in part on said data descriptive of said machine's specific state.

12. The system of claim 11, wherein said memory further has embodied therein a plurality of recommendation profiles, wherein each of said recommendation profiles contains an impact value for each of a plurality of problem categories, said impact value reflecting the degree to which each of said plurality of modifications effects said general condition of a machine having a servo system.

13. The system of claim 11, said central processing unit further configured to present an ordered set of recommended actions based on said machine condition profile.

14. The system of claim 11, further comprising a terminal in communication with said central processing unit.

15. The system of claim 14, wherein said terminal comprises a web browser.

16. The system of claim 11, wherein said terminal is in communication with said central processing unit over a network.

17. The system of claim 16, wherein said network is an Internet.

18. An expert system for recommending a modification to a machine having a servo system, said expert system comprising a server configured to receive data descriptive of one or more servo system problems and to present data descriptive of an ordered set of solutions to said one or more servo system problems.

19. The expert system of claim 18, wherein said server is in communication with a terminal.

20. The expert system of claim 19, wherein said server is in communication with a terminal over a network.

21. The expert system of claim 20, wherein said network is an Internet.

22. The expert system of claim 19, wherein said terminal comprises a personal computer.

23. The expert system of claim 22, wherein a web browser runs on said personal computer.

24. The expert system of claim 19, wherein said terminal is configured to provide said server with data descriptive of a machine's specific state.

* * * * *